(12) United States Patent
Hayashi

(10) Patent No.: US 8,415,898 B2
(45) Date of Patent: Apr. 9, 2013

(54) CONNECTOR, A LAMP CONNECTOR, A LAMP CONNECTION CHECKING CIRCUIT, AND AN ILLUMINATION DEVICE

(75) Inventor: Keiji Hayashi, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/442,165

(22) PCT Filed: May 9, 2007

(86) PCT No.: PCT/JP2007/059579
§ 371 (c)(1),
(2), (4) Date: Apr. 23, 2009

(87) PCT Pub. No.: WO2008/035483
PCT Pub. Date: Mar. 27, 2008

(65) Prior Publication Data
US 2010/0019678 A1 Jan. 28, 2010

(30) Foreign Application Priority Data
Sep. 21, 2006 (JP) .................. 2006-255457

(51) Int. Cl.
*G05F 1/00* (2006.01)
(52) U.S. Cl.
USPC .......................... 315/307; 315/291; 439/517
(58) Field of Classification Search .................. 315/291, 315/306–308, 297; 439/56, 59, 92, 93, 94, 439/105, 119, 146, 147, 208, 226, 227, 228, 439/229, 232, 235, 236, 237, 280, 290, 291, 439/375, 377, 517, 581, 605, 620.02, 620.06, 439/439/620.15, 620.22, 620.24, 656, 708, 439/709, 711, 722, 723
See application file for complete search history.

(56) References Cited

U.S. PATENT DOCUMENTS
5,828,177 A 10/1998 Toda et al.
5,886,758 A 3/1999 Ibaraki FOREIGN PATENT DOCUMENTS
CN 1196500 A 10/1998
JP 05-097098 U 12/1993
JP 09-092474 A 4/1997
JP 2006-172978 A 6/2006

OTHER PUBLICATIONS

English translation of Official Communication issued in corresponding Chinese Patent Application No. 2007800347014, mailed on Jan. 26, 2011.
Official Communication issued in International Patent Application No. PCT/JP2007/059579, mailed on Jun. 12, 2007.

*Primary Examiner* — Douglas W Owens
*Assistant Examiner* — Jianzi Chen
(74) *Attorney, Agent, or Firm* — Keating & Bennett, LLP

(57) ABSTRACT

A lamp connector allows for checking of a connection between an external electrode of an external electrode tubular lamp and a terminal fitting into which the external electrode is fitted. Because the lamp connector into which an external electrode provided on the outer surface of an end portion of a tubular lamp is fitted includes a terminal fitting which includes a terminal piece and a terminal piece insulated from each other which are to be individually brought into contact with the external electrode, it is possible to easily check conduction between the external electrode and the terminal fitting using a tester. Accordingly, any poor fitting of the lamp into the connector can be readily found and corrected.

3 Claims, 7 Drawing Sheets

CONNECTOR, A LAMP CONNECTOR, A LAMP CONNECTION CHECKING CIRCUIT, AND AN ILLUMINATION DEVICE

BACKGROUND OF THE INVENTION

1. Field of the Invention

The present invention relates to a lamp connector which allows for checking of a connection between an external electrode of an external electrode tubular lamp such as an EEFL and a terminal fitting, into which the external electrode is fitted.

2. Description of the Related Art

In a flat-screen liquid crystal display device having a translucent liquid crystal display panel, an illumination device is generally placed on the back side of the crystal display panel. This illumination device, which includes a linear light source such as a cold cathode fluorescent lamp as a light source, adjusts characteristics of light emitted by the linear light source and illuminates the display panel from the back side. The light passes through the display panel, and thus an image is made visible on the front side of the display panel.

This type of illumination device is disclosed in Japanese Patent Application Unexamined Publication No. 2006-172978. As the linear light source of the illumination device, a fluorescent lamp having an external electrode known as an EEFL (External Electrode Fluorescent Lamp) is used and has electrodes formed at end portions thereof outside of the glass tube. FIG. 8 shows a lamp connector used for connection of an external electrode fluorescent lamp. As shown here, a terminal fitting 30 of the lamp connector includes two contact pieces 30a which hold an external electrode 31a formed at an end portion of a lamp 31. The contact pieces 30a are provided with contact portions 30b which oppose each other and are in the form of a bended plane. The inner surfaces of the contact portions 30b are brought into contact with the outer surface of the external electrode 31a, thereby providing a conduction connection.

However, although the above lamp connector functions satisfactorily when the external electrode 31a is reliably connected to the terminal fitting 30, if the connection is insufficient, a high voltage for lighting the lamp is applied to a portion with poor contact of the terminal fitting 30. If the poor contact occurs due to an error in assembly, the lamp is not lit when the lamp is lit for the first time, i. e., during lamp lighting inspection after the assembly. In addition, electrical discharge occurs between the contact piece and the external electrode of the lamp at the poor contact portion, causing them to be overheated and thus damaged. To repair this damage, the lamp and a power supply circuit which drives the lamp both need to be replaced. That is, in the conventional configuration, lighting the lamp without noticing an assembly error causes significant loss of members.

SUMMARY OF THE INVENTION

Hence, the present invention aims to provide a lamp connector which allows for checking of a connection between an external electrode provided on the outer surface of an end of a tubular lamp and a terminal fitting to which the external electrode is fitted, a lamp connection checking circuit, and an illumination device.

In order to overcome the problems described above, a lamp connector according to a preferred embodiment of the present invention into which an external electrode provided on the outer surface of an end portion of a tubular lamp is to be fitted includes a terminal fitting which includes two terminal pieces insulated from each other which are to be individually brought into contact with the external electrode.

It is preferable that the terminal fitting includes a fitting portion into which a member for conduction connection between the two terminal pieces is to be fitted. It is also preferable that the lamp connector further includes a connecting portion with which the lamp connector is to be connected to a circuit board.

In another preferred embodiment of the present invention, a lamp connection checking circuit includes a connector into which an external electrode provided on the outer surface of an end portion of a tubular lamp is to be fitted including a terminal fitting which includes two terminal pieces insulated from each other which are to be individually brought into contact with the external electrode, a power supply circuit connected with one of the terminal pieces, which is arranged to supply driving power to the tubular lamp, and a voltage detecting circuit connected to the other terminal piece, which is arranged to convert current into voltage, the current flowing from the terminal piece connected to the power supply circuit via the external electrode and the terminal piece connected to the voltage detecting circuit.

It is preferable that the lamp connection checking circuit further includes a shutdown circuit which is arranged to shut down the supply of the driving power if a predetermined voltage is not detected by the voltage detecting circuit.

Yet, in another preferred embodiment of the present invention, an illumination device includes the lamp connector or the lamp connection checking circuit described above.

Yet, in another preferred embodiment of the present invention, a connector into which an element which is substantially circular in cross section is to be fitted includes a terminal fitting of a socket shape which includes two terminal pieces insulated from each other which are to be brought into contact with the element.

It is preferable that the terminal fitting further includes an attachment portion to which a contact component for conduction connection between the two terminal pieces is attached. It is also preferable that the contact component includes a connecting portion with which the connector is to be connected to a circuit board. In addition, it is also preferable that the connector includes an element-side connector portion to which the terminal fitting is attached, a circuit-board-side connector portion to which the contact component is attached, the element-side connector portion and the circuit-board-side connector portion being separable from each other.

Because the lamp connector into which the external electrode provided on the outer surface of the end portion of the tubular lamp is to be fitted includes the terminal fitting which includes the two terminal pieces insulated from each other which are to be individually brought into contact with the external electrode, it is possible to easily check conduction between the external electrode and the terminal fitting using a tester or other devices. Accordingly, any poor fitting of the external electrode to the connector can be readily found and corrected.

If the terminal fitting includes the fitting portion into which the member for conduction connection between the two terminal pieces is to be fitted, conduction connection between the two terminal pieces is easily made, and connection to the power supply circuit which supplies driving power to the lamp is also easily made using the member for conduction connection. In addition, if the terminal fitting further includes the connecting portion with which the lamp connector is to be connected to a circuit board, it is possible to directly connect the connector to, for example, a power supply circuit board which supplies driving power to the lamp. Consequently, it is possible to omit components such as a harness for connecting the connector and an inverter circuit board.

Because the lamp connection checking circuit includes the connector into which the external electrode provided on the outer surface of the end portion of the tubular lamp is to be fitted including the terminal fitting which includes the two terminal pieces insulated from each other which are to be individually brought into contact with the external electrode, the power supply circuit connected with one of the terminal pieces, which is arranged to supply driving power to the tubular lamp, and the voltage detecting circuit connected to the other terminal piece, which is arranged to convert current into voltage, the current flowing from the terminal piece connected to the power supply circuit via the external electrode and the terminal piece connected to the voltage detecting circuit, it is possible to check conduction between the external electrode and the terminal fitting without using a tester or other devices.

If the lamp connection checking circuit further includes the shutdown circuit which is arranged to shut down the supply of the driving power if a predetermined voltage is not detected by the voltage detecting circuit, the lamp is not lit if, for example, the lamp is disconnected from the connector by external forces such as vibration after the lamp is secured to the connector, which prevents problems including a problem that a peripheral member catches fire due to electrical discharge caused by the contact failure.

If the illumination device includes the lamp connector or the lamp connection checking circuit described above, the connection reliability between the lamp and the connector is improved, making the brightness of the lamp in use uniform.

Because the connector into which the element which is substantially circular in cross section is to be fitted includes the terminal fitting of a socket shape which includes the two terminal pieces insulated from each other which are to be brought into contact with the element, it is possible to easily check conduction between the element such as a fuse and the terminal fitting of a socket shape using a tester or other devices. Accordingly, any poor fitting of the element such as a fuse to the connector can be readily found and corrected.

If the terminal fitting further includes the attachment portion to which the contact component for conduction connection between the two terminal pieces is attached, conduction connection between the two terminal pieces can be easily made. If the contact component includes the connecting portion with which the connector is to be connected to a circuit board, connection to an external circuit can be easily made. In addition, if the connector includes the element-side connector portion to which the terminal fitting is attached, the circuit-board-side connector portion to which the contact component is attached, the element-side connector portion and the circuit-board-side connector portion being separable from each other, the circuit board can be easily replaced if it is defective.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
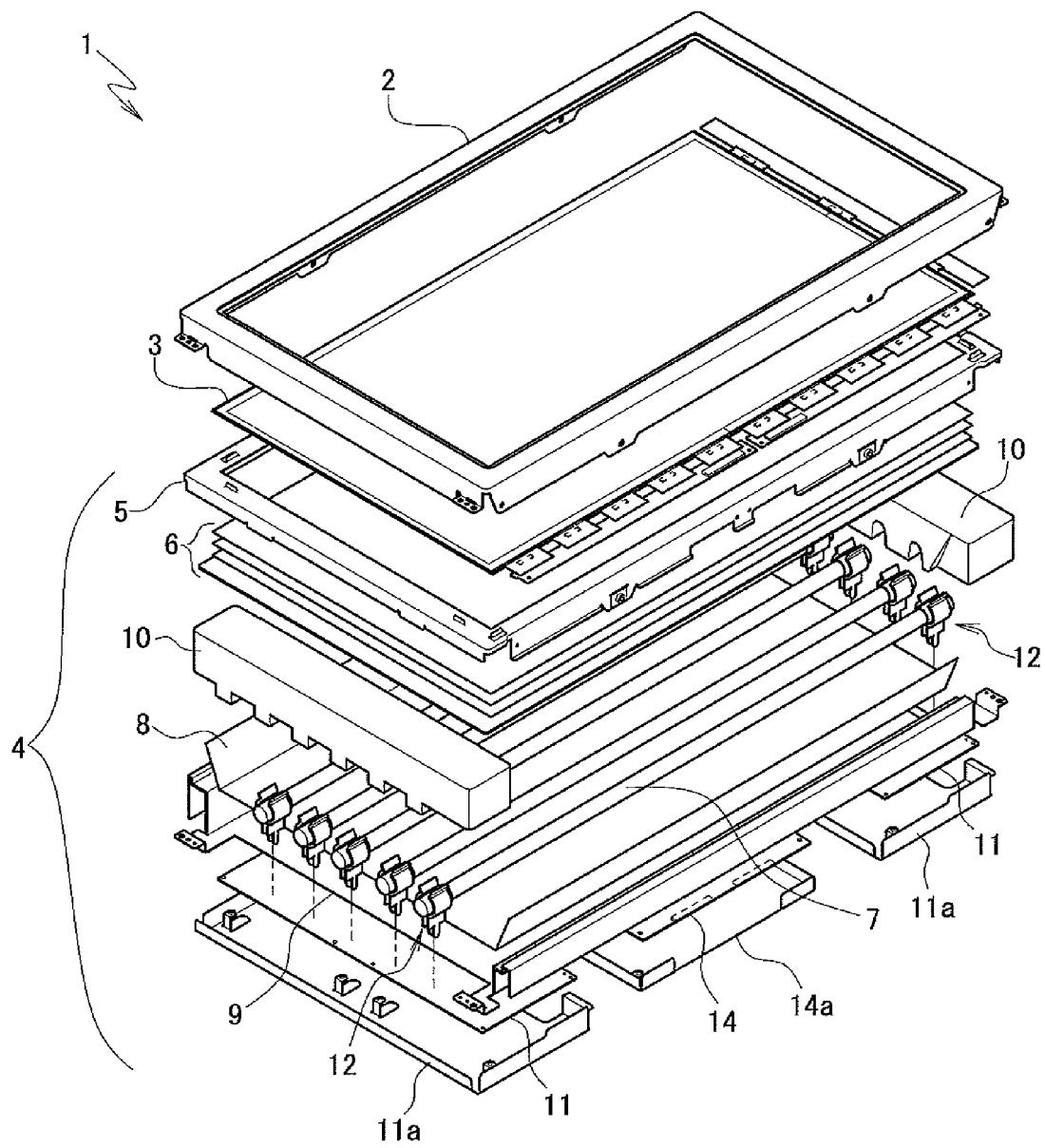
FIG. 1 is an exploded perspective view schematically showing a display device having an illumination device according to a preferred embodiment of the present invention.

A detailed description of a lamp connector and an illumination device including the lamp connector according to preferred embodiments of the present invention will now be given with reference to the accompanying drawings. FIG. 1 is a schematic view showing the structure of relevant components of a display device including the illumination device according to the preferred embodiment of the present invention.

A liquid crystal display device 1 shown in FIG. 1 includes a bezel 2, a display panel 3, and an illumination device 4. The bezel 2 is a member serving as a frame of the display panel 3, and the display panel 3 includes two glass plates joined to each other and a liquid crystal filled therebetween.

The illumination device 4 includes a frame 5, optical sheets 6, external electrode tubular lamps 7, a reflector 8, a chassis 9, side holders 10, and inverter circuit boards 11. The frame 5 is shaped like a picture frame and is used to secure the optical sheets 6 to support surfaces of the chassis 9 and the side holders 10. The optical sheets 6 are used to adjust the characteristics of light entering the display panel 3 from the external electrode tubular lamps 7 and preferably include a diffusion plate, a diffusion sheet, a lens sheet, and a polarizing reflection sheet which are arranged from bottom to top.

As the external electrode tubular lamps 7, EEFLs (External Electrode Fluorescent Lamps) are used each having electrodes provided at end portions thereof on the outer surface of a glass tube. Lamp connectors 12 are attached to the both end portions of each of the external electrode tubular lamps 7. The reflection plate 8 placed under the external electrode tubular lamps 7 is used to reflect light emitted by the external electrode tubular lamps 7 toward the display panel 3. The chassis 9 and the side holders 10 are members for forming a lamp housing which houses the external electrode tubular lamps 7 in parallel. The chassis 9 is a substantially box-shaped member which is preferably prepared by subjecting a metal plate material to plate metal processing, and constitutes the bottom and the side walls on the long side of the lamp housing. The side holder 10s are members which are made from a white resin material, and similarly constitute the side walls on the short side of the lamp housing.

On the back surface of the chassis 9, the inverter circuit boards 11 and 11 which generate high alternating voltages to drive the external electrode tubular lamps 7 are provided as a power supply unit. The inverter circuit boards 11 alternately apply voltages in opposite phases to the electrodes at the end portions of the external electrode tubular lamps 7, and drive the external electrode tubular lamps 7. Additionally, a control circuit board 14 which controls the display panel 3 is provided on the back surface of the chassis 9. The inverter circuit boards 11 and the control circuit board 14 are covered by inverter circuit board covers 11a and a control circuit board cover 14a, respectively.

Figure 2:
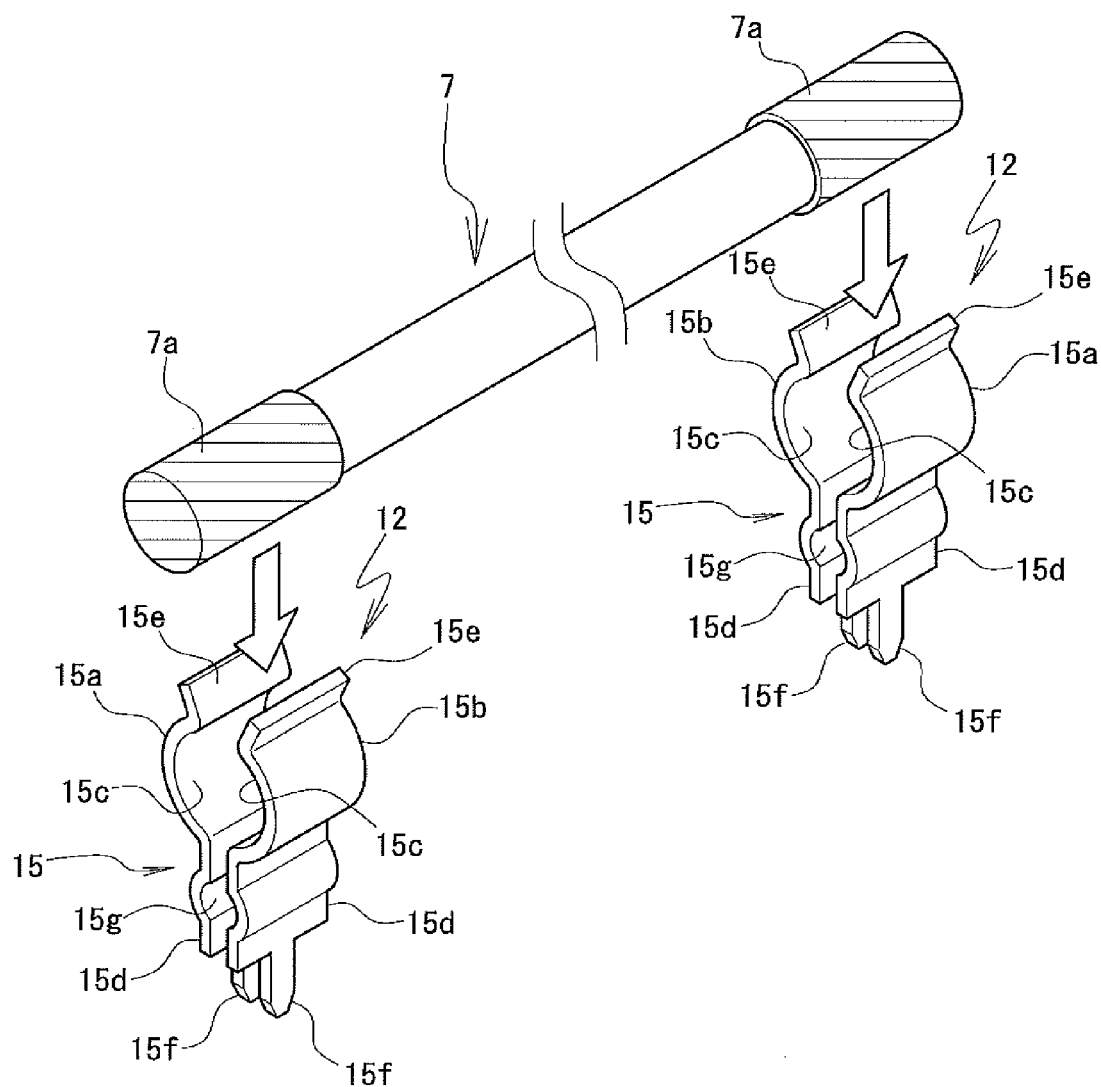
FIG. 2 is a schematic perspective view showing lamp connectors of the illumination device shown in FIG. 1.

A description of the lamp connector according to the present preferred embodiment of the present invention is given referring to FIG. 2. As shown here, the lamp connectors 12 each includes a terminal fitting 15 including two terminal pieces 15a and 15b. The terminal pieces 15a and 15b are each prepared by stamping it out of a conductive plate material with a die and bending it preferably by press working, and are supplied with driving voltage for external electrodes 7a of the external electrode tubular lamp 7. The terminal pieces 15a and 15b include contact portions 15c and 15c opposing each other and upright portions 15d and 15d extended downward from the contact portions 15c and 15c.

At the top ends of the contact portions 15c and 15c, guide portions 15e and 15e are arranged to tilt outward so that the external electrode 7a is easily fitted thereinto. At the bottom ends of the upright portions 15d and 15d, connecting portions 15f and 15f to be inserted into a hole such as a through hole formed in the inverter circuit board 11 are provided to facilitate fixation to the inverter circuit board 11. In addition, middle sections of the upright portions 15d and 15d are bent toward opposite directions from each other forming a fitting hole 15g into which a conducting member 18 shown in FIG. 4 is fitted.

Figure 3:
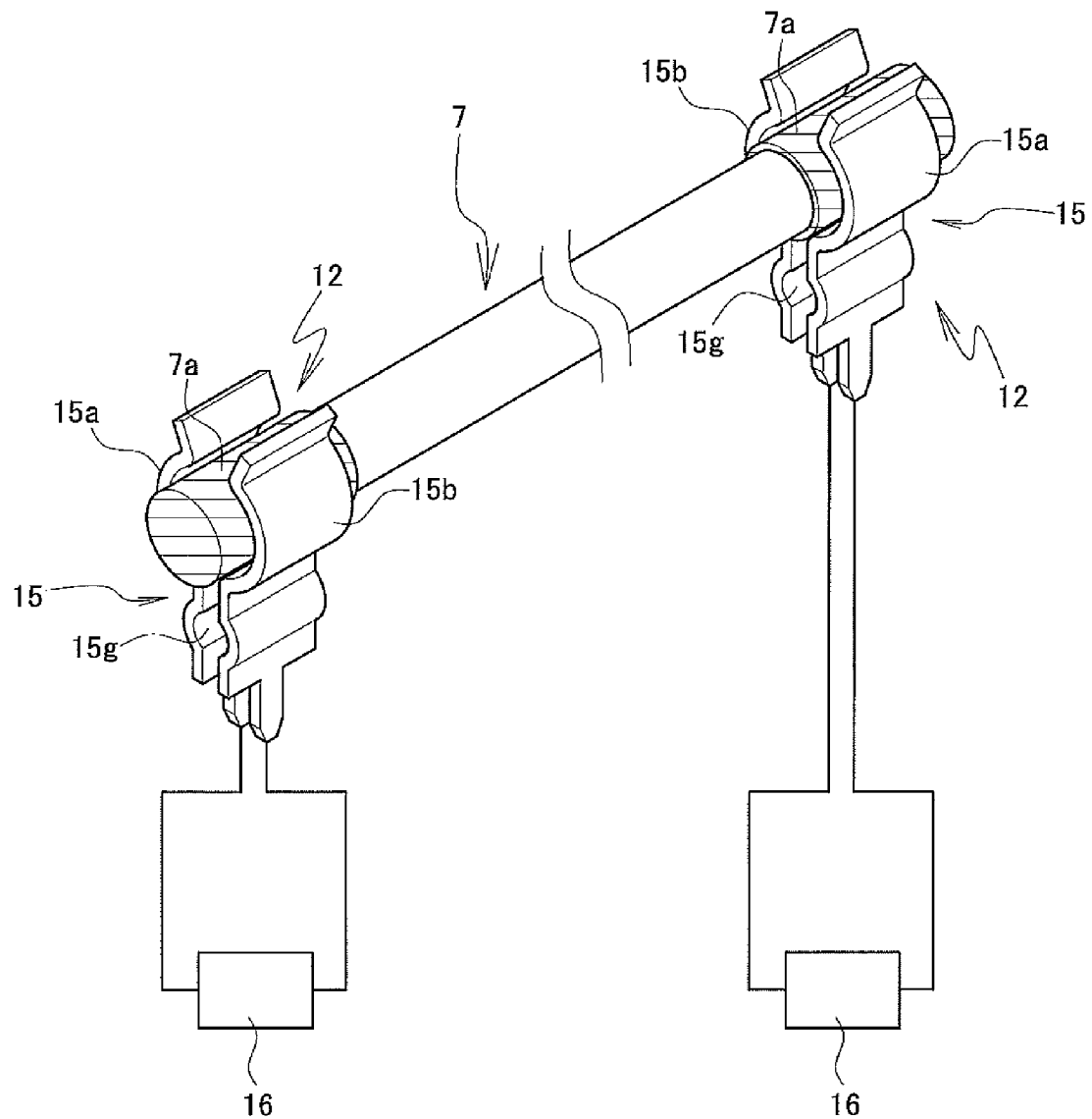
FIG. 3 is a view showing a state where a conduction check is performed with external electrodes of a tubular lamp fitted into the lamp connectors shown in FIG. 2.

FIG. 3 is a view showing a state where a conduction check is performed by testers 16 with the external electrodes 7a of the external electrode tubular lamps 7 fitted into the terminal fittings 15 of the lamp connectors 12. Because each of the terminal fittings 15 includes two separate terminal pieces 15a and 15b as shown here, it is possible to easily check the connection condition between the external electrode 7a and the terminal fitting 15. Accordingly, any poor fitting of the lamp into the connector can be readily found and corrected.

Figure 4:
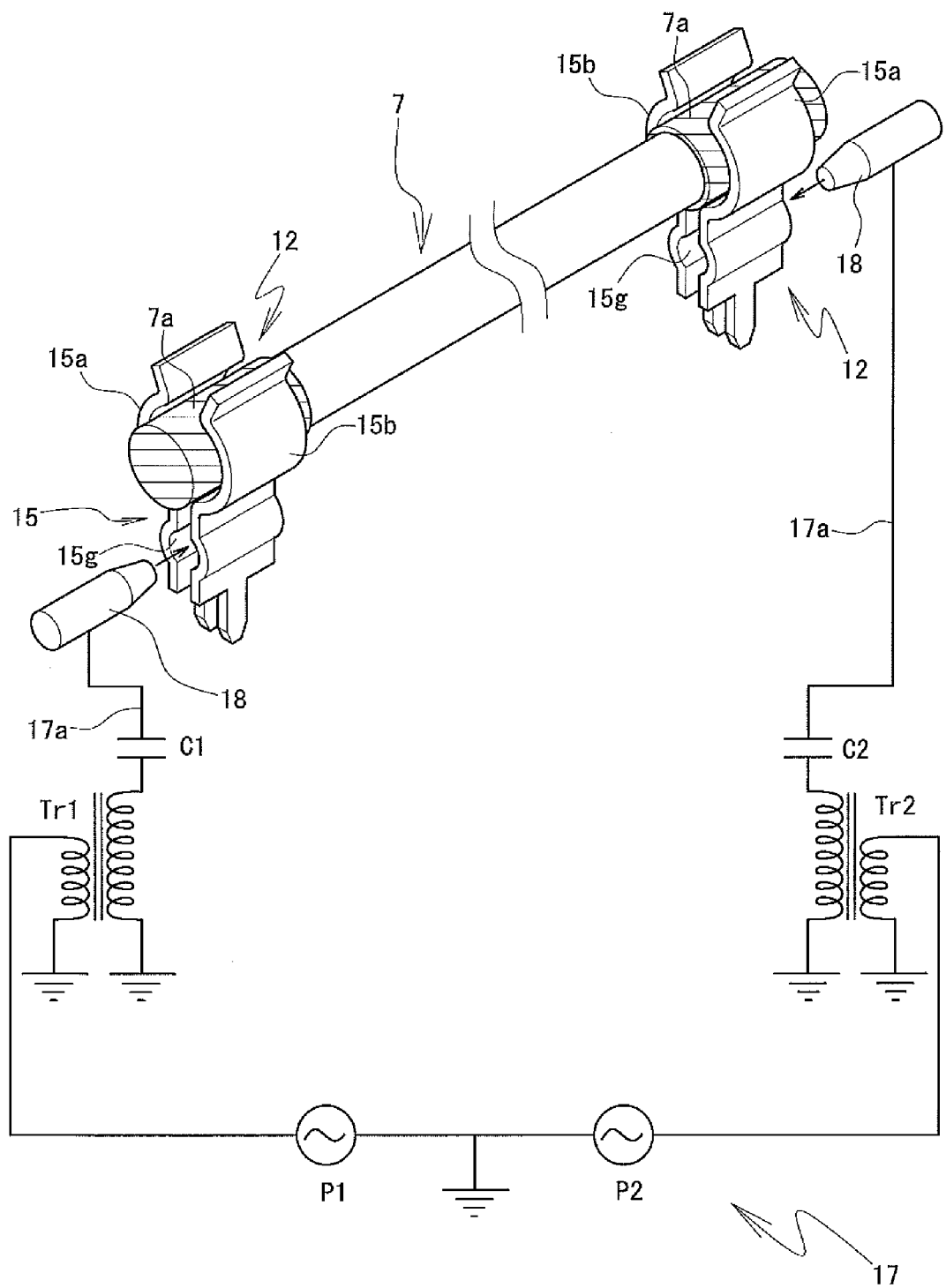
FIG. 4 is a view showing a state where external electrodes of a tubular lamp are fitted into the lamp connectors shown in FIG. 2 and the lamp connectors are connected to a power supply circuit.

FIG. 4 is a view showing connection between the lamp connectors 12 and power supply circuits 17 of the inverter circuit boards 11 and 11 shown in FIG. 1. The conducting members 18, having the shape of a bar as shown in FIG. 4, are prepared by subjecting a metal bar to metal processing and are fitted into the fitting holes 15g of the terminal fittings 15. The conducting members 18 are connected to power supply lines 17a from the power supply circuit 17, and the power supply circuit 17 is connected to the external electrode tubular lamp 7 by fitting the conducting members 18 into the fitting holes 15g of the terminal fittings 15.

The power supply circuit 17 is used to apply high voltages in opposite phases alternately to the electrodes 7a at the both end portions of the external electrode tubular lamp 7 and includes power driving portions P1 and P2 which perform switching to convert externally-inputted direct current power into an alternating pulse voltage, power converting portions Tr1 and Tr2 which raise the alternating pulse voltage outputted from the power driving portions P1 and P2 to a high voltage of several hundreds volts (V) or higher and feed the high voltage to the external electrode tubular lamp 7, and ballast capacitors C1 and C2.

The foregoing configuration of the lamp connectors 12 makes it possible to supply driving power to the external electrode tubular lamp 7 by fitting the conducting members 18 connected to the power supply lines 17a of the power supply circuit 17 to the fitting holes 15g of the terminal fittings 15 as shown in FIG. 4 after the external electrodes 7a of the external electrode tubular lamp 7 are fitted into the terminal fittings 15 of the lamp connectors 12, conduction checks are performed using the testers 16, and the conduction conditions are evaluated to be satisfactory. Accordingly, the lamp is not lit when the connection between the external electrodes 7a and the terminal fittings 15 is insufficient, preventing problems such as electric discharge due to a contact failure.

Figure 5:
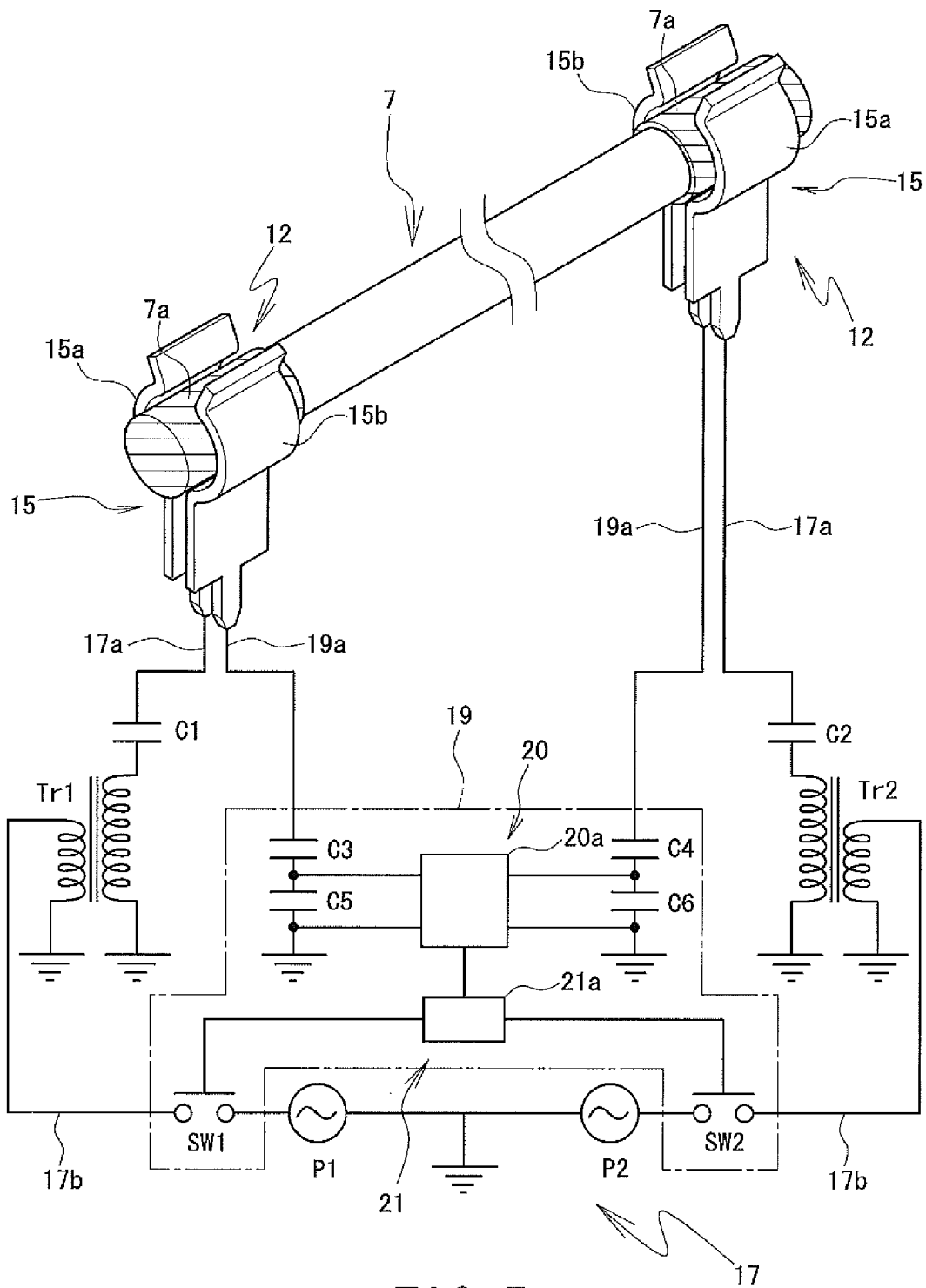
FIG. 5 is a schematic diagram showing a lamp connection checking circuit according to a preferred embodiment of the present invention.

Next, a description of a lamp connection checking circuit according to another preferred embodiment of the present invention is given referring to FIG. 5. Constituent elements common to the foregoing preferred embodiment of the present invention are assigned the same reference numerals and descriptions thereof are omitted, and different constituent elements are mainly described. The terminal pieces 15a and 15b of the terminal fittings 15 shown in FIG. 5 do not have the fitting holes 15g shown in FIG. 2.

In this preferred embodiment of the present invention, the inverter circuit boards 11 and 11 shown in FIG. 1 have a lamp connection checking circuit 19 shown in FIG. 5 in addition to the power supply circuit 17 shown in FIG. 4. The power supply lines 17a of the power supply circuit 17 are each connected to the terminal piece 15a which is one of the two terminal pieces 15a and 15b of the terminal fitting 15. In addition, check lines 19a and 19a of the lamp connection checking circuit 19 are each connected to the other terminal piece 15b. The lamp connection checking circuit 19 includes a voltage detecting circuit 20 and a shutdown circuit 21.

The voltage detecting circuit 20 includes capacitors C3 and C5 connected to one of the check lines 19a and 19a, capacitors C4 and C6 connected to the other check line 19a, and a voltage detecting portion 20a which detects the voltages of the capacitors C5 and C6. Output voltages from the check lines 19a and 19a are divided respectively by the capacitors C3 and C5 and the capacitors C4 and C6, and the divided voltages of the capacitors C5 and C6 are inputted into the voltage detecting portion 20a. The voltage detecting portion 20a evaluates whether or not the inputted voltages of the capacitor C5 and C6 satisfy a predetermined value and outputs the evaluation results as control signals to a shutdown portion 21a of the shutdown circuit 21.

The shutdown circuit 21 includes switches SW1 and SW2 located respectively at some midpoints of the power supply lines 17b and 17b and the shutdown portion 21a which controls ON/OFF operation of the switches SW1 and SW2. In addition to operating the switches SW1 and SW2 at the time of connection checking by the lamp connection checking circuit 19, the shutdown portion 21a operates the switches SW1 and SW2 according to the control signal from the voltage detecting portion 20a.

Figure 6:
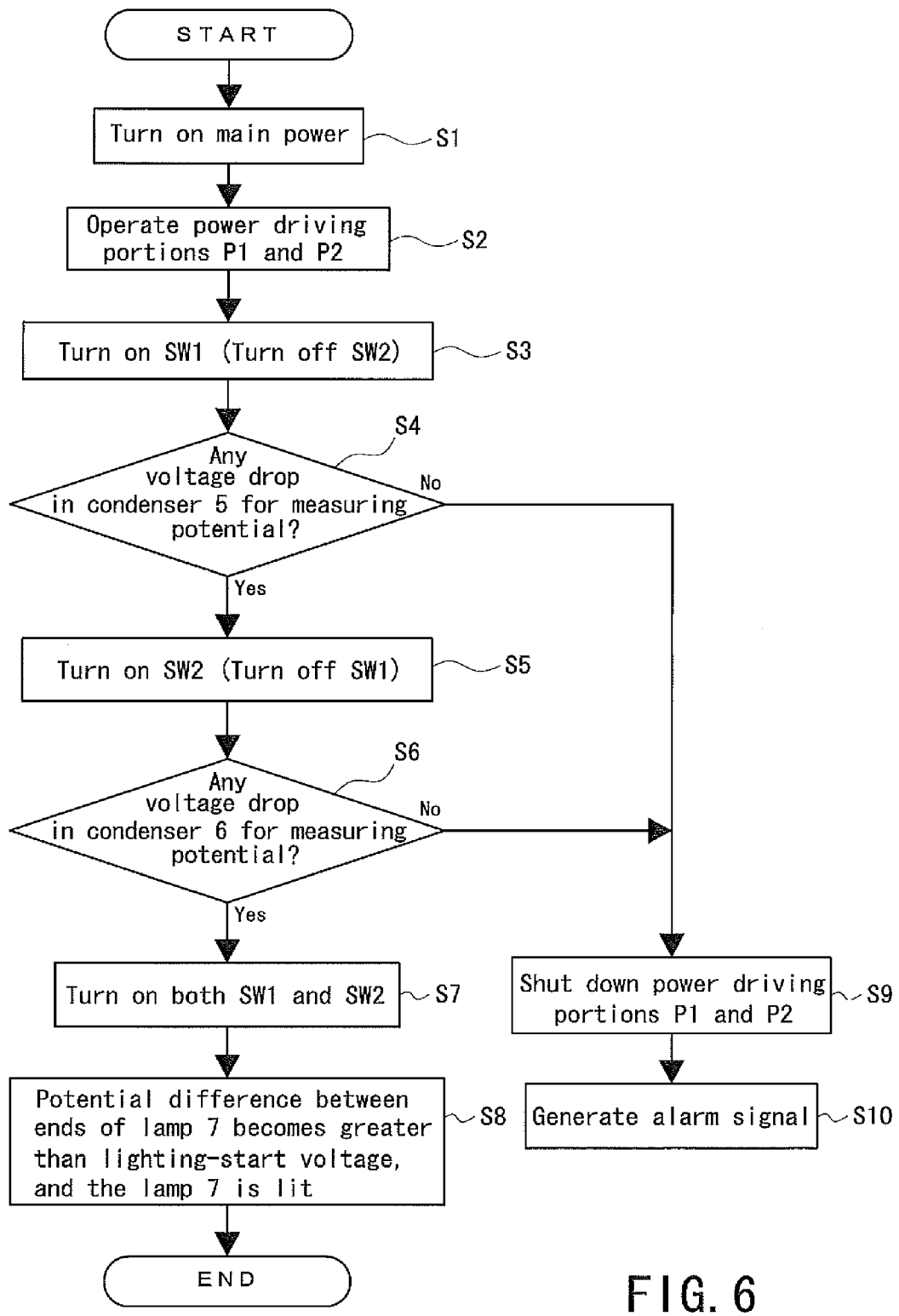
FIG. 6 is a flowchart showing operation procedures of the lamp connection checking circuit shown in FIG. 5.

A description of operations of the lamp connection checking circuit 19 shown in FIG. 5 is given referring to the flowchart shown in FIG. 6. When the main power of the crystal display device 1 is turned on, the power driving portions P1 and P2 start operation (S1 and S2). The shutdown portion 21a of the shutdown circuit 21 first turns on the switch SW1 and turns off the switch SW2 (S3). Accordingly, an alternating voltage is applied to the terminal piece 15a via the power converting portion Tr1. The alternating voltage is also applied to the capacitors C3 and C5 via the terminal piece 15a, the external electrode 7a, the terminal piece 15b, and the check line 19a.

Then the voltage detecting portion 20a of the voltage detecting circuit 20 evaluates whether or not the inputted voltage of the capacitor C5 satisfies the predetermined value (S4). If no voltage drop is evaluated to be present in the capacitor C5 for measuring potential based on the detection by the voltage detecting portion 20a (S4 (No)), the operations of the power driving portions P1 and P2 are shut down (S9), an alarm signal is generated (S10), and notification is generated by a notification mechanism (not shown).

If a voltage drop is evaluated to be present in the capacitor C5 for measuring potential, based on the detection by the voltage detecting portion 20a (S4 (Yes)), the shutdown portion 21a of the shutdown circuit 21 turns on the switch SW2 and turns off the switch SW1 (S5). Accordingly, an alternating voltage is applied to the terminal piece 15a via the power converting portion Tr2. The alternating voltage is also applied to the capacitors C4 and C6 via the terminal piece 15a, the external electrode 7a, the terminal piece 15b, and the check line 19a.

Then the voltage detecting portion 20a of the voltage detecting circuit 20 evaluates whether or not the inputted voltage of the capacitor C6 for measuring potential satisfies the predetermined value (S6). If no voltage drop is evaluated to be present in the capacitor C6 for measuring potential, based on the detection by the voltage detecting portion 20a (S6 (No)), the operations of the power driving portions P1 and P2 are shut down (S9), an alarm signal is generated (S10), and a notification is generated by the notification mechanism (not shown).

If a voltage drop is evaluated to be present in the capacitor C6 for measuring potential based on the detection by the voltage detecting portion 20a (S6 (Yes)), the shutdown portion 21a of the shutdown circuit 21 turns on both the switches SW1 and SW2 (S7). When a potential difference between the ends of the lamp 7 becomes greater than the lighting-start voltage, the lamp 7 is lit (S8).

By such a lamp connection checking circuit, it is possible to perform a conduction check between a lamp and connectors using an existing power supply circuit, and other devices for a conduction check such as a tester is not necessary. Additionally, because a conduction check between the lamp and the connectors is performed at the time of lighting the lamp, the lamp is not lit if, for example, the lamp is disconnected from the connectors by external forces such as vibration after the lamp is secured to the connectors, which prevents a high voltage from being applied with the lamp left disconnected from the lamp.

The foregoing description of the preferred embodiments of the present invention has been presented for purposes of illustration and description. However, it is not intended to limit the present invention to the preferred embodiments described herein, and modifications and variations are possible as long as they do not deviate from the principles of the invention. For example, while used in the preferred embodiments of the present invention is a lamp of the both-side high-voltage driving type in which high voltages in opposite phases are applied to the electrodes at the both end portions of the lamp, it is also preferable to use a lamp of the one-side high-voltage driving type.

Figure 7:
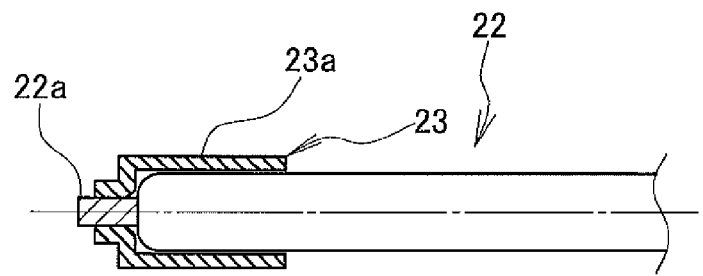
FIG. 7 is a view showing a modified preferred embodiment of a tubular lamp used in the present invention.
Figure 8:
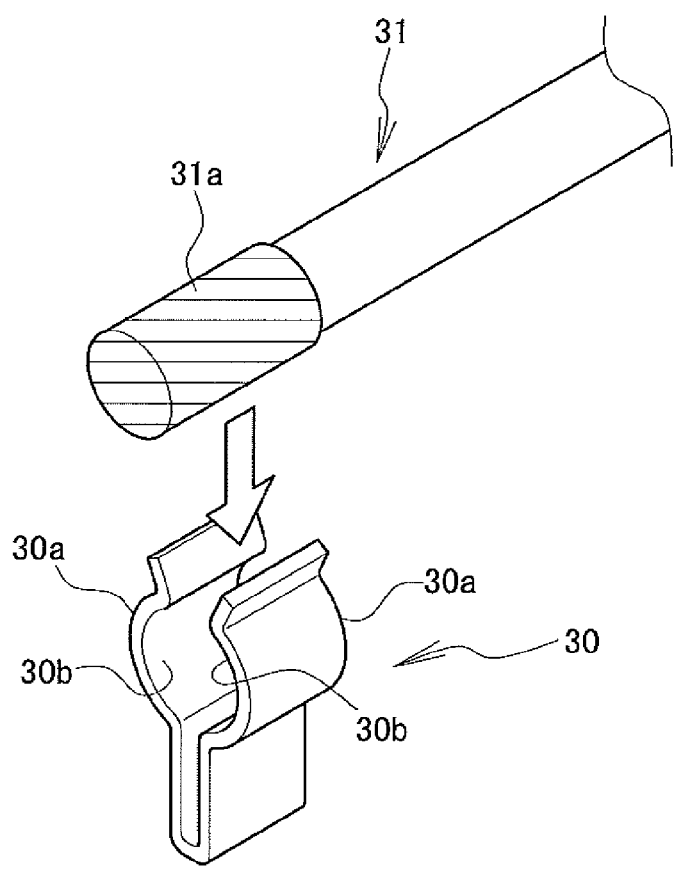
FIG. 8 is a schematic view showing a lamp connector of a conventional illumination device.

In addition, while used as one example of the external electrode tubular lamp in the preferred embodiments of the present invention is an EEFL, it is also preferable to use an external electrode tubular lamp in which an electrode 22a in a bar shape of a general CCFL (Cold Cathode Fluorescent Lamp) 22 is connected with a conductive cap 23 as shown in FIG. 7 so that the outer surface of the cap 23 defines an external electrode 23a.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lamp connection checking circuit comprising:
    a connector into which an external electrode provided on an outer surface of an end portion of a tubular lamp is to be fitted including a terminal fitting which includes at least two terminal pieces insulated from each other which are arranged to be individually brought into contact with the external electrode;
    a power supply circuit connected with one of the at least two terminal pieces, which is arranged to supply driving power to the tubular lamp; and
    a voltage detecting circuit connected to the other of the at least two terminal pieces, which is arranged to convert current into voltage, the current flowing from the one of the at least two terminal pieces connected to the power supply circuit via the external electrode and the other of the at least two terminal pieces connected to the voltage detecting circuit.

2. The lamp connection checking circuit according to claim 1, further comprising a shutdown circuit which is arranged to shut down the supply of the driving power if a predetermined voltage is not detected by the voltage detecting circuit.

3. An illumination device comprising the lamp connection checking circuit according to claim 1.

* * * * *